(12) United States Patent
Park

(10) Patent No.: US 8,893,484 B2
(45) Date of Patent: Nov. 25, 2014

(54) SOLID SCR SYSTEM AND HEATING METHOD FOR SOLID SCR REDUCTANT USING THE SAME

(75) Inventor: Jun Sung Park, Yongin (KR)

(73) Assignee: Hyundai Motor Company, Seoul (KR)

( * ) Notice: Subject to any disclaimer, the term of this patent is extended or adjusted under 35 U.S.C. 154(b) by 80 days.

(21) Appl. No.: 13/309,034

(22) Filed: Dec. 1, 2011

(65) Prior Publication Data

US 2013/0047584 A1 Feb. 28, 2013

(30) Foreign Application Priority Data

Aug. 30, 2011 (KR) .................. 10-2011-0087311

(51) Int. Cl.
*F01N 3/00* (2006.01)
*F01N 3/20* (2006.01)
*F01N 5/02* (2006.01)

(52) U.S. Cl.
CPC .............. *F01N 3/2066* (2013.01); *F01N 5/02* (2013.01); *Y02T 10/16* (2013.01); *Y02T 10/24* (2013.01); *F01N 2610/02* (2013.01); *F01N 2610/10* (2013.01); *F01N 2610/12* (2013.01); *F01N 2610/14* (2013.01)
USPC ................... 60/303; 60/324; 60/320; 60/274; 60/295

(58) Field of Classification Search
CPC ........ Y02T 10/16; F01N 5/02; F01N 2610/14
USPC .................................................. 60/272–324
See application file for complete search history.

(56) References Cited

U.S. PATENT DOCUMENTS

| | | | |
|---|---|---|---|
| 3,404,731 A * | 10/1968 | Cushman | 165/51 |
| 6,266,955 B1 * | 7/2001 | Liang et al. | 60/274 |
| 6,301,879 B1 * | 10/2001 | Weisweiler et al. | 60/274 |
| 6,387,336 B2 * | 5/2002 | Marko et al. | 423/212 |
| 6,702,190 B1 * | 3/2004 | Nohl et al. | 237/12.3 C |
| 6,837,041 B2 * | 1/2005 | Hernier | 60/286 |
| 6,935,103 B2 * | 8/2005 | Binder et al. | 60/286 |
| 7,966,811 B2 * | 6/2011 | Reed | 60/286 |
| 8,088,336 B2 * | 1/2012 | Suzuki et al. | 422/148 |
| 8,361,422 B2 * | 1/2013 | Soukhojak et al. | 423/212 |
| 2009/0123361 A1 * | 5/2009 | Johannessen et al. | 423/352 |
| 2010/0021780 A1 * | 1/2010 | Johannessen et al. | 429/19 |
| 2010/0043413 A1 * | 2/2010 | Orihashi et al. | 60/320 |
| 2010/0293927 A1 * | 11/2010 | Johannessen et al. | 60/295 |

FOREIGN PATENT DOCUMENTS

| | | |
|---|---|---|
| JP | 2008-68225 A | 3/2008 |
| JP | 2010-138883 A | 6/2010 |

* cited by examiner

*Primary Examiner* — Thomas Denion
*Assistant Examiner* — Anthony Ayala Delgado
(74) *Attorney, Agent, or Firm* — Morgan, Lewis & Bockius LLP

(57) ABSTRACT

A solid SCR system includes solid state reductant, a container storing the solid state reductant, an exhaust pipe supplying gas state reductant converted from the solid state reductant and SCR catalyst disposed on the exhaust pipe, an exhaust heat recovery device disposed on the exhaust pipe and recovering waste heat from exhaust gas exhausted through the exhaust pipe and a heat exchanger connected to the exhaust heat recovery device and supplying the recovered heat to the solid state reductant.

8 Claims, 5 Drawing Sheets

SOLID SCR SYSTEM AND HEATING METHOD FOR SOLID SCR REDUCTANT USING THE SAME

CROSS-REFERENCE TO RELATED APPLICATION

This application claims priority of Korean Patent Application No. 10-2011-0087311 filed Aug. 30, 2011, the entire contents of which application is incorporated herein for all purposes by this reference.

BACKGROUND OF INVENTION

1. Field of Invention

The present invention relates to a solid SCR system and a heating method for a solid SCR reductant. More particularly, the present invention relates to a solid SCR system and a heating method for a solid SCR reductant using the solid SCR system which uses waste heat exhausted through an exhaust pipe.

2. Description of Related Art

Generally, exhaust gas exhausted from an exhaust manifold of an engine is guided to a catalytic converter disposed and purified, and then passes though a muffler to reduce noise, and then finally is exhausted through an exhaust pipe to atmosphere.

The catalytic converter treats pollutant such as NOx within the exhaust gas.

A Selective Catalytic Reduction (SCR) apparatus, one of the catalytic converter, purifies NOx within the exhaust gas, and urea, ammonia, carbon monoxide and hydrocarbon (HC) and so on are used as reductant.

When the reductant is supplied to the exhaust gas, nitrogen oxide within the exhaust gas is deoxidized to nitrogen by oxidation-reduction reaction with the reductant.

The SCR, one of exhaust gas post processing devices, may remove nitrogen oxide regardless vehicle driving condition, and an urea SCR may reduce nitrogen dioxide and nitrogen monoxide within exhaust gas to nitrogen gas by dosing urea into the exhaust gas.

FIG. 5 is a partial cross-sectional view showing a conventional solid SCR system.

Referring to FIG. 5, solid state reductant 20 is stored within a container 10. When a pump 34 and a heat exchanger 32 are operated, a heat exchanging medium 30 applies heat to the solid state reductant 20 in order to be converted to gas state reductant 80.

And then the gas state reductant 80 controlled by a control valve 60 is supplied to an exhaust pipe 94 disposed in front of a SCR catalyst 90 via a supply pipe 70.

At this moment, signals of temperature and pressure within the container 10 are transmitted from a pressure/temperature signal transmitter 40 to a controller 50.

However, a conventional solid SCR system has complicated structure and cost of an entire system is relative high and thus practically it is not used widely.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a solid SCR system and a heating method for a solid SCR reductant using the solid SCR system which may use waste heat exhausted through an exhaust pipe.

And also, various aspects of the present invention may provide a solid SCR system which may enhance vehicle energy efficiency and reduce vehicle weight with relatively low cost.

A solid SCR system including solid state reductant, a container storing the solid state reductant, an exhaust pipe supplying gas state reductant converted from the solid state reductant and SCR catalyst disposed on the exhaust pipe, the solid SCR system according to various aspects of the present invention may include an exhaust heat recovery device disposed on the exhaust pipe and recovering waste heat from exhaust gas exhausted through the exhaust pipe and a heat exchanger connected to the exhaust heat recovery device and supplying the recovered heat to the solid state reductant.

The solid SCR system may further include a flow control valve disposed within the exhaust pipe for selectively supplying the exhaust gas to the exhaust heat recovery device The exhaust heat recovery device may include an insulation member disposed circumference of the exhaust heat recovery device for insulating heat and a partition for guiding the exhaust gas.

The heat exchanger may include a circulation pipe in which heat transfer fluid circulates, a pump circulating the heat transfer fluid within the circulation pipe and a heat diffusion fin releasing the heat transferred from the heat transfer fluid.

The heat exchanger may be connected to a heat storage device storing the recovered heat.

A heating method for solid SCR reductant using a solid SCR system including a container storing the solid state reductant and an exhaust heat recovery device recovering waste heat from exhaust gas exhausted through a exhaust pipe by heat exchange, the heating method according to various aspects of the present invention may include (a) comparing temperature and pressure within the container with a predetermined values, (b) comparing temperature of the exhaust heat recovery device with the temperature within the container when the temperature and pressure within the container is lower than the predetermined values in the step (a), (c) recovering waste heat from the exhaust gas by heat exchange with the exhaust gas in the exhaust heat recovery device when the temperature of the exhaust heat recovery device is higher than the temperature within the container in the step (b) and (d) heating the solid state reductant by the recovered heat.

The heating method may further include stopping the heat exchange with the exhaust gas when the temperature and pressure within the container is higher than the predetermined values in the step (a).

The heating method may further include stopping the heat exchange with the exhaust gas when the temperature of the exhaust heat recovery device is lower than the temperature within the container in the step (b).

According to various aspects of the present invention, a solid SCR system and a heating method for a solid SCR reductant using the solid SCR system may use waste heat exhausted through an exhaust pipe without a heater, and thus vehicle energy efficiency may be enhanced, and vehicle weight may be reduced with relatively low cost.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
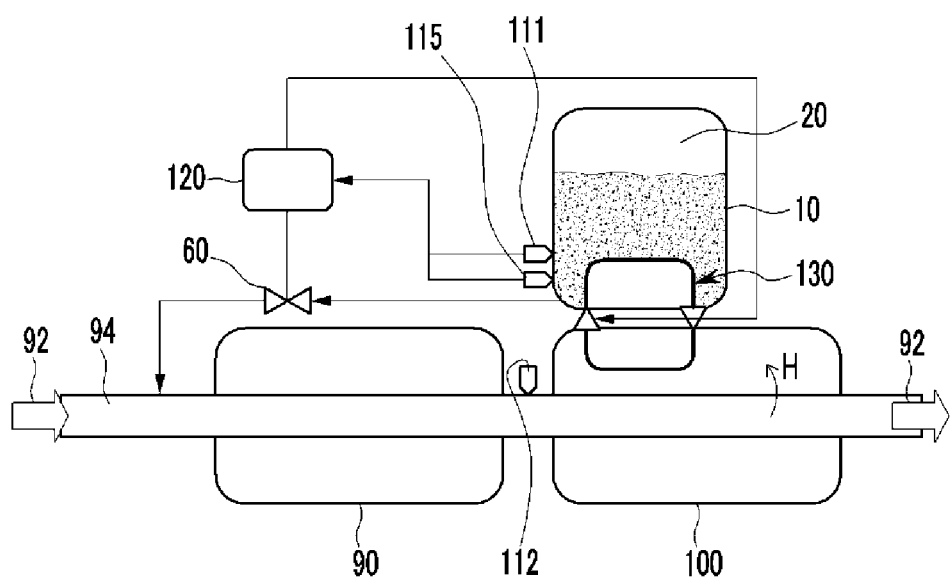
FIG. 1 is a drawing showing an exemplary solid SCR system according to the present invention.

FIG. 1 is a drawing showing a solid SCR system according to various embodiments of the present invention.

Referring to FIG. 1, according to a solid SCR system of various embodiments of the present invention, SCR catalyst 90 is disposed on an exhaust pipe 94, solid state reductant 20 is stored in a container 10 and gas state reductant 80 is selectively supplied to an exhaust pipe 94 in front of the SCR catalyst 90 by controlling of a control valve 60.

The solid SCR system according to various embodiments of the present invention includes an exhaust heat recovery device 100 disposed on the exhaust pipe 94 and recovering waste heat H from exhaust gas 92 exhausted through the exhaust pipe 94 and a heat exchanger 130 disposed between the container 10 and the exhaust heat recovery device 100 and supplies the waste heat H to the container 10.

Figure 3:
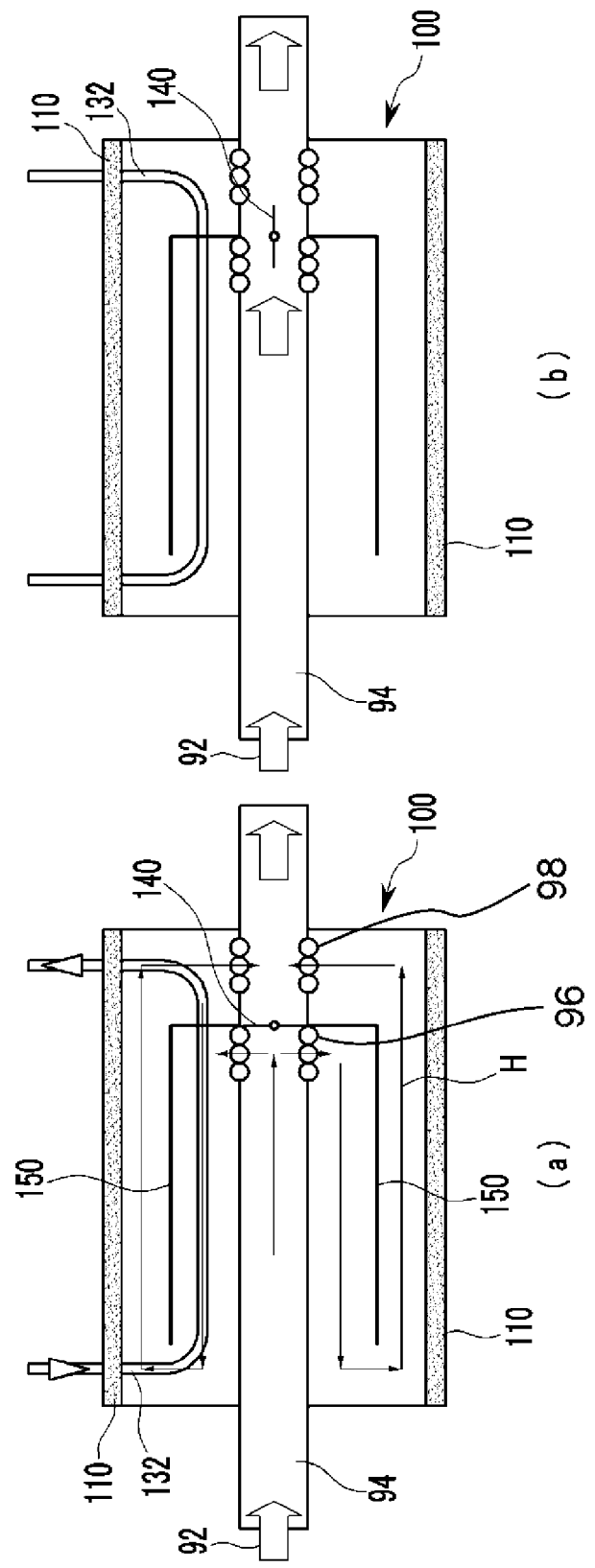
FIGS. 3(a) and 3(b) are a cross-sectional views of an exemplary exhaust heat recovery device according to the present invention.

FIG. 3 is a cross-sectional view of an exhaust heat recovery device according to various embodiments of the present invention.

Referring to FIG. 3, the exhaust heat recovery device 100 wraps the exhaust pipe 94 and a partition 150 is formed therein for guiding heat flow. An insulation member 110 is disposed circumference of the exhaust heat recovery device 100 for insulating the heat H.

In (b) of FIG. 3, it is showing flowing of the exhaust gas when the exhaust heat recovery device 100 is not operated.

When it is not required to recover the waste heat H of the exhaust gas 92, as shown in (b) of FIG. 3, the flow control valve 140 is opened for the exhaust gas 92 not to flow within the exhaust heat recovery device 100 but flow out to atmosphere.

However, when it is required to recover the waste heat H of the exhaust gas 92, the exhaust pipe 94 is closed and the exhaust gas 92 is guided by the partition 150 through the first hole 96. And then the exhaust gas 92 flows within the exhaust heat recovery device 100 and supplies heat to the heat exchanger 130 and flows into the exhaust pipe 94 through a second 98 as shown in (a) of FIG. 3.

Figure 4:
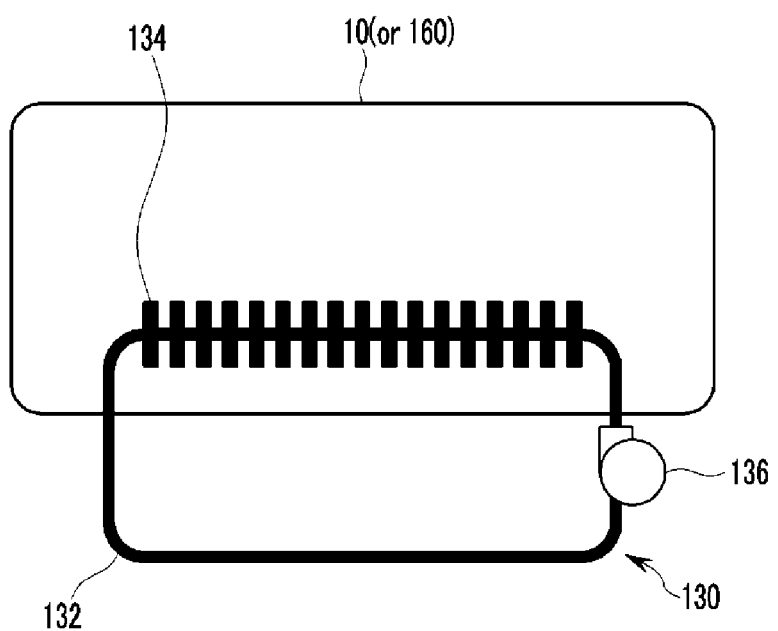
FIG. 4 is a drawing showing an exemplary heat exchanger according to the present invention.
Figure 5:
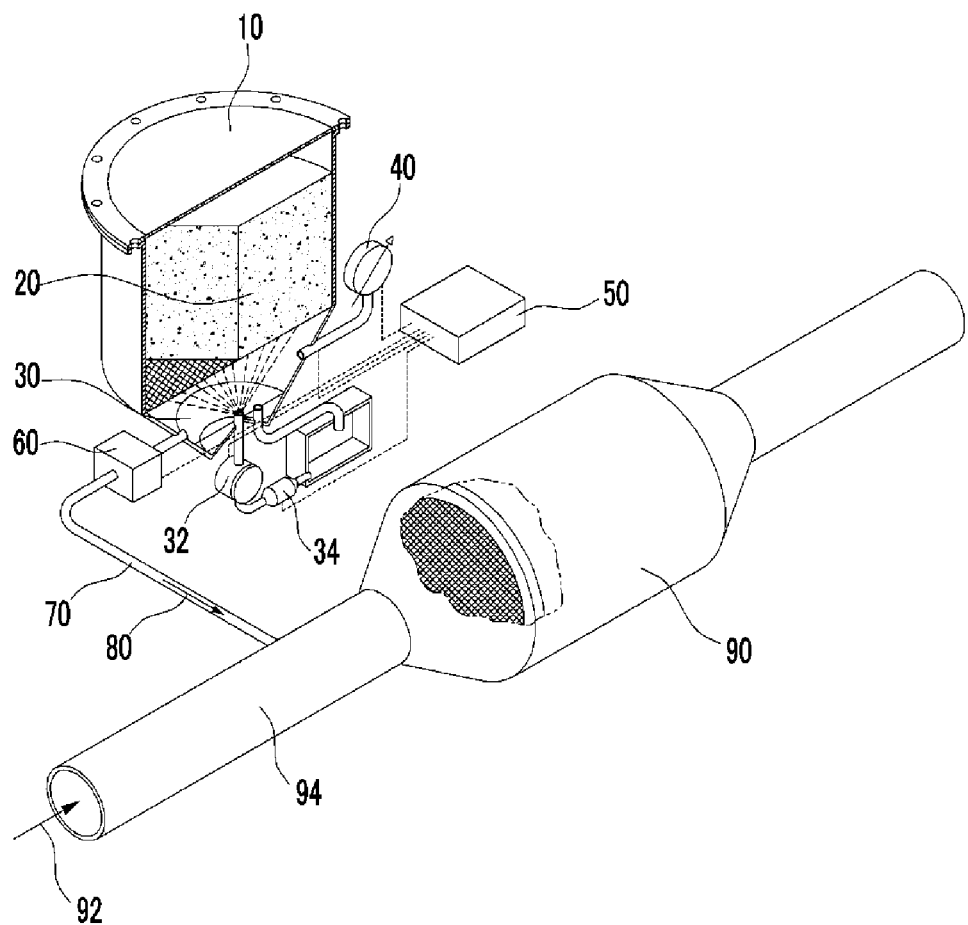
FIG. 5 is a partial cross-sectional view showing a conventional solid SCR system.

FIG. 4 is a drawing showing a heat exchanger according to various embodiments of the present invention.

Referring to FIG. 4, the heat exchanger 130 includes a circulation pipe 132 in which heat transfer fluid circulates, a pump 136 circulating the heat transfer fluid within the circulation pipe 132 and a heat diffusion fin 134 releasing the heat transferred from the heat transfer fluid.

The heat exchanger 130 may be disposed between the container 10 and the exhaust heat recovery device 100 and supplies directly the heat to the container 10.

Also, a heat storage device 160 including heat storing material may be used for storing the waste heat of the exhaust gas and may supply the heat to the container 10 when rapid temperature increasing is required.

The heat storing material and the heat storage device are obvious to a person of an ordinary skill in the art, and thus detailed description will be omitted.

According to various embodiments of the present invention, the exhaust heat recovery device 100 may be disposed after the SCR catalyst 90 integrally, and thus spatial utility may be enhanced.

Hereinafter, a heating method for solid SCR reductant using the solid SCR system according to various embodiments of the present invention will be described.

Figure 2:
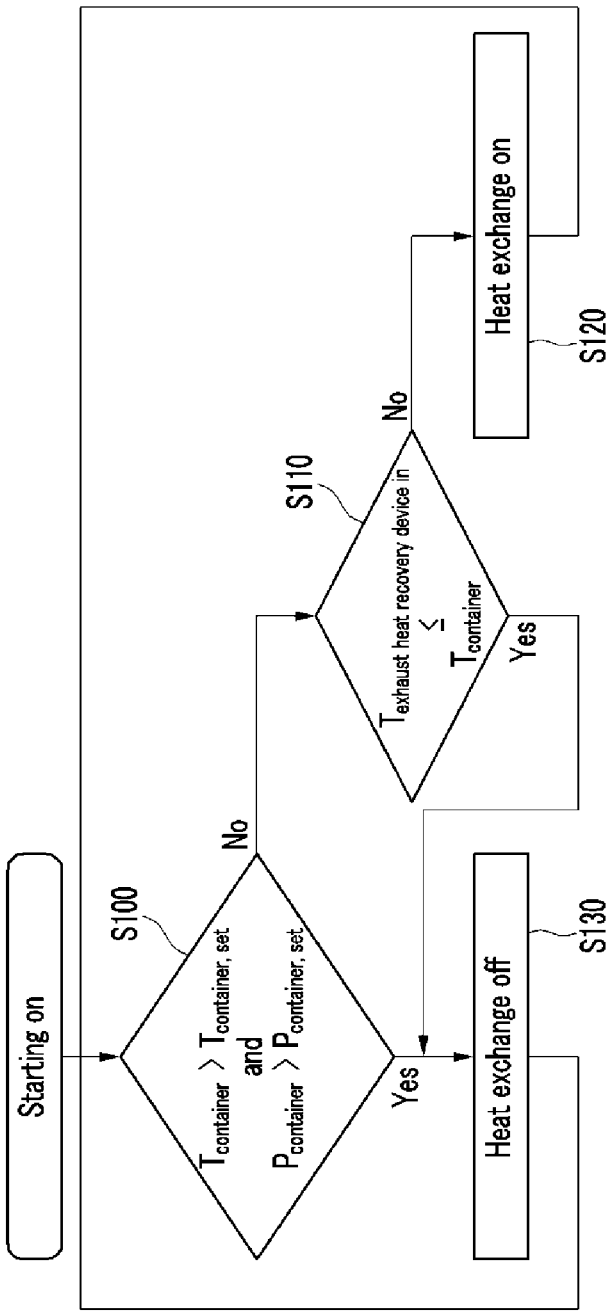
FIG. 2 is a flowchart of an exemplary heating method for solid SCR reductant according to the present invention.

FIG. 2 is a flowchart of a heating method for solid SCR reductant according to various embodiments of the present invention.

Referring to FIG. 2, when a vehicle is operated (key on), temperature within the container $T_{container}$ is compared with a predetermined container temperature $T_{container,set}$. Also, pressure within the container $P_{container}$ is compared with a predetermined container pressure $P_{container, set}$ S100.

The temperature and the pressure within the container 10 are detected by a temperature sensor 111 and a pressure sensor 115 and the detected values are input to a dosing controller unit (DCU) 120.

Also, temperature of the exhaust gas 92 is detected by a temperature sensor 112.

The detected temperature of the exhaust gas 92 may allow estimating what degree of the waste heat may be recovered.

The predetermined container temperature $T_{container,set}$ and the predetermined container pressure $P_{container, set}$ are determined by considering vaporization of the solid state reductant 20 into the gas state reductant 80.

If the temperature and the pressure within the container 10 are higher than the predetermined values $T_{container,set}$ and $P_{container, set}$ in the step S100, it is not required to recover the heat from the exhaust gas 92 and thus the exhaust gas heat exchanger 130 is not operated S130.

If the temperature or the pressure within the container 10 are not higher than the predetermined values $T_{container,set}$ and $P_{container,set}$ in the step S100, it is required to recover the heat from the exhaust gas 92 S110.

Before recovering the waste heat from the exhaust gas, temperature of the exhaust heat recovery device 100 $T_{exhaust\ heat\ recovery\ device\ in}$, detected by the temperature sensor 113, is compared with the temperature within the container 10 $T_{container}$ S110, and the waste heat H of the exhaust gas 92 is recovered and exchanges the heat if the temperature of the heat recovery device 100 $T_{exhaust\ heat\ recovery\ device\ in}$, is higher than the temperature within the container 10 $T_{container}$ S120.

And thus the solid state SCR reductant 20 is applied heat without a heater. Also, the temperature and the pressure within the container 10 may be maintained above the predetermined values $T_{container,set}$ and $P_{container, set}$.

The recovering the waste heat may be implemented by the exhaust heat recovery device 100 and the flow control valve 140.

In FIG. 3, flowing of the waste heat H of the exhaust gas is shown. If it is required to recover the waste heat H from the exhaust gas 92, the flow control valve 140, as shown in (a) of FIG. 3, closes the exhaust pipe 94 and thus the exhaust gas 92 flows into the exhaust heat recovery device 100.

The waste heat H is transferred to the circulation pipe 132 within the exhaust heat recovery device 100 and then to the heat transfer fluid within the circulation pipe 132 and thus recovering the heat from the exhaust gas 92 is realized.

The recovered heat may be directly supplied to the container 10 or may be stored within the heat storage device 160 and then applied if required.

As described above method, the solid state reductant 20 within the container 10 is converted to the gas state reductant 80 by the waste heat of the exhaust gas, and then the gas state reductant 80 is selectively supplied to the exhaust pipe 94 by controlling of the control valve 60 in order to oxidize NOx into nitrogen.

For convenience in explanation and accurate definition in the appended claims, the terms front, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A solid SCR system comprising:
   a solid state reductant;
   a container storing the solid state reductant;
   an exhaust pipe fluid-connected to the container and receiving gas state reductant converted from the solid state reductant;
   a SCR catalyst disposed on the exhaust pipe;
   an exhaust heat recovery device containing the exhaust pipe therein and recovering waste heat from exhaust gas exhausted through the exhaust pipe, wherein the exhaust heat recovery device includes a partition extending in an upstream direction of the exhaust gas for guiding the exhaust gas within the exhaust heat recovery device, and wherein a first hole is formed to the exhaust pipe under the partition to receive the exhaust gas;
   a heat exchanger connected to the inside of the exhaust heat recovery device and the inside of the container and supplying the recovered heat to the solid state reductant in the container, wherein the heat exchanger includes a circulation pipe passing through a space formed between the exhaust gas pipe and the partition and under the partition and fluid-connecting the exhaust heat recovery device and the container, wherein the space is fluid-connected to the first hole, and wherein heat transfer fluid circulates in the circulation pipe; and
   a flow control valve disposed within the exhaust pipe inside the exhaust heat recovery device for selectively supplying the exhaust gas to the inside of the exhaust heat recovery device,
   wherein a second hole is formed on the exhaust pipe in rear of the flow control valve.

2. The solid SCR system of claim 1, wherein the exhaust heat recovery device comprises:
   an insulation member disposed around a circumference of the exhaust heat recovery device for insulating heat.

3. The solid SCR system of claim 1, wherein the heat exchanger comprises:
   a pump circulating the heat transfer fluid within the circulation pipe; and
   a heat diffusion fin releasing the heat transferred from the heat transfer fluid.

4. The solid SCR system of claim 1, wherein the heat exchanger is connected to a heat storage device storing the recovered heat.

5. A heating method for solid SCR reductant using a solid SCR system comprising a container storing the solid state reductant and an exhaust heat recovery device recovering waste heat from exhaust gas exhausted through a exhaust pipe by heat exchange, the heating method comprising:
   (a) comparing temperature and pressure within the container with predetermined temperature and pressure values;
   (b) comparing temperature of the exhaust heat recovery device with the temperature within the container when the temperature and pressure within the container is lower than the predetermined values in the step (a);
   (c) recovering waste heat from the exhaust gas by heat exchange with the exhaust gas in the exhaust heat recovery device when the temperature of the exhaust heat recovery device is higher than the temperature within the container in the step (b); and
   (d) heating the solid state reductant by the recovered heat;
   wherein the exhaust pipe is fluid-connected to the container and receives gas state reductant converted from the solid state reductant;
   wherein the SCR catalyst is disposed on the exhaust pipe;
   wherein the exhaust heat recovery device contains the exhaust pipe therein;
   wherein a heat exchanger is connected to the inside of the exhaust heat recovery device and the inside of the container and supplies the recovered heat to the solid state reductant in the container; and
   wherein a flow control valve is disposed within the exhaust pipe inside the exhaust heat recovery device for selectively supplying the exhaust gas to the inside of the exhaust heat recovery device.

6. The heating method of claim 5, wherein the heating method further comprises:
   stopping the heat exchange with the exhaust gas when the temperature and pressure within the container is higher than the predetermined values in the step (a).

7. The heating method of claim 5, wherein the heating method further comprises:
   stopping the heat exchange with the exhaust gas when the temperature of the exhaust heat recovery device is lower than the temperature within the container in the step (b).

8. The solid SCR system of claim 1, wherein the first hole is formed on the exhaust pipe in front of the flow control valve.

* * * * *